United States Patent

Schwyn

[11] Patent Number: 6,068,717
[45] Date of Patent: May 30, 2000

[54] PROCESS FOR PRODUCING PACKAGING TUBES

[76] Inventor: Bernhard Andreas Schwyn, Bergstrasse 39, CH-6004 Lucerne, Switzerland

[21] Appl. No.: 09/011,935
[22] PCT Filed: Jun. 16, 1997
[86] PCT No.: PCT/CH97/00240
     § 371 Date: Jun. 10, 1998
     § 102(e) Date: Jun. 10, 1998
[87] PCT Pub. No.: WO97/49545
     PCT Pub. Date: Dec. 31, 1997

[30] Foreign Application Priority Data

Jun. 25, 1996 [CH] Switzerland .............................. 1585/96

[51] Int. Cl.$^7$ ................................................. B29D 23/20
[52] U.S. Cl. ........................... 156/69; 156/198; 156/306.6
[58] Field of Search ........................... 156/69, 198, 306.6

[56] References Cited

U.S. PATENT DOCUMENTS

| | | | |
|---|---|---|---|
| 3,700,513 | 10/1972 | Haberhauer | 156/69 |
| 4,132,331 | 1/1979 | Magerle | 156/69 |

FOREIGN PATENT DOCUMENTS

| | | |
|---|---|---|
| 2158169 | 6/1973 | France . |
| 2235476 | 1/1974 | Germany . |

*Primary Examiner*—Daniel Stemmer
*Attorney, Agent, or Firm*—Bachman & LaPointe, P.C.

[57] ABSTRACT

There are prior art packaging tubes consisting of a tube body (11) with a prefabricated head (13) which is melted on the inner circumference of the body. This method of jointing can result in faulty, i.e. leaking tubes. According to the invention, the tube body (11) and head (13) are bonded together by means of a material section (26), e.g. plastifiable synthetic material, thus providing stable and sealed, i.e. fault-free, bonds.

12 Claims, 2 Drawing Sheets

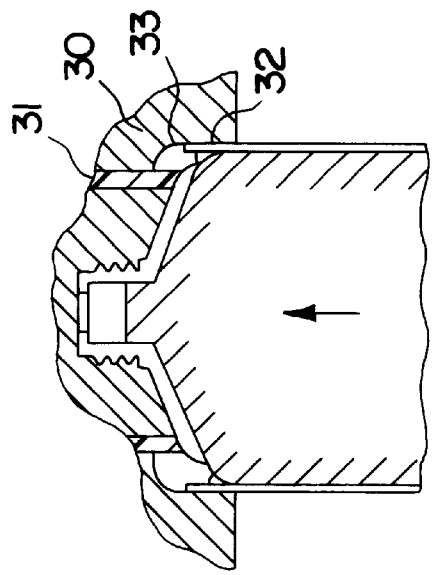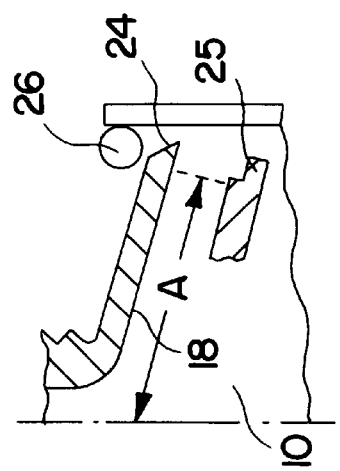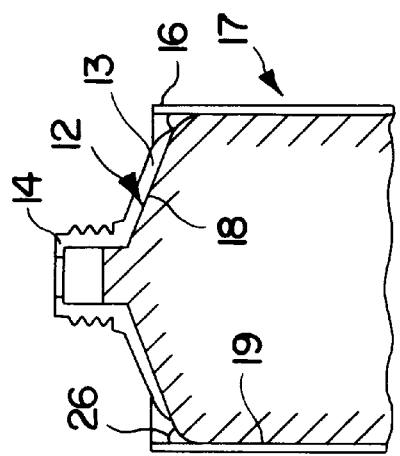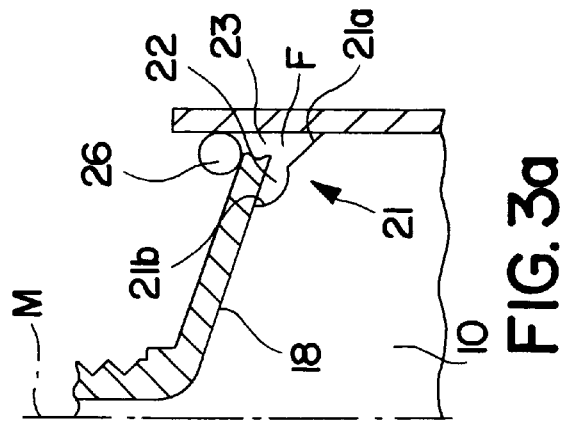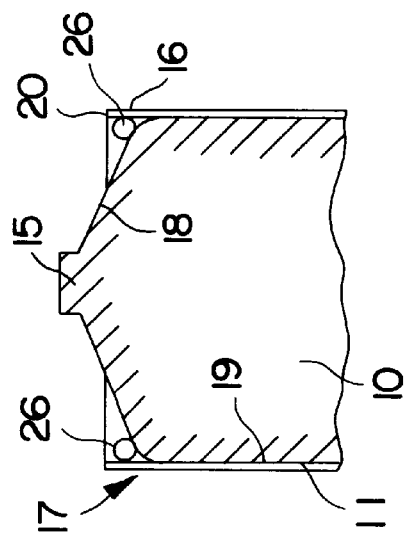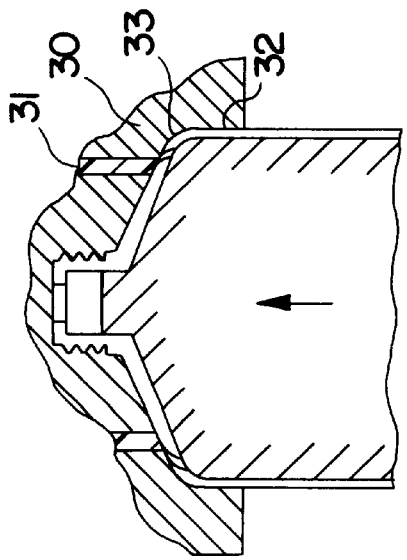

PROCESS FOR PRODUCING PACKAGING TUBES

BACKGROUND OF THE INVENTION

The invention concerns a process for the production of packaging tubes as set forth in the classifying portion of claim 1.

The manufacture of packaging tubes comprising a tube body portion formed by a single-layer or multi-layer plastic laminate, the term multi-layer plastic laminate also includes a plastic laminate containing a metallic (aluminium) barrier layer, and a tube head which is formed from a plastic material, is essentially dominated by two technologies which differ in that one of them involves joining a prefabricated tube head to a tube body portion (hereinafter also referred to as the 'finished-head technology' for the sake of brevity) while in the other technology the tube head, as it is being formed, that is to say shaped, is joined to the tube body portion (hereinafter also referred to as the 'moulding-on technology' for the sake of brevity). The invention lies in the field of the former, that is to say in the field of the finished-head technology.

In the tube industry, the finished-head technology has experienced a not insignificant spread. That is because the outputs of tubes (body portions with head) per unit of time are higher in comparison with the moulding-on technology. That involves simple machine operations for bringing heads and tube body portions together, relatively low levels of capital investment costs for the head/body portion joining apparatuses and the possibility of fitting the head with closures etc in the course of the process, that is to say immediately after the head/body portion connection has been made. The disadvantages of the finished-head technology lie in the very close production tolerances of the tube body portion and the head. Added to that are material compatibilities, which have to be accurately matched, between the material of the inner layer of the tube body portion and the material of the tube head, the inner layer representing the critical component of a good connection between the body portion and the head. For example the connection of a body portion comprising polyethylene or having an inner layer of polyethylene, to a tube head of the same material, is difficult to such an extent that, to overcome the difficulties involved, the shoulder of the tube head (connection from the tube body portion to the discharge nozzle of the tube) is to be provided with a barrier or a blocking layer. That critical material compatibility is an impediment to making full use of the advantages of the finished-head technology, insofar as the body portions and the heads of different materials can admittedly be prefabricated and stored, but they cannot be combined just as may be desired, for the purposes of satisfying different requirements in terms of material to be packaged.

SUMMARY OF THE INVENTION

Taking that state of the art as its basic starting point, the object of the present invention is to develop the finished-head technology in such a way that the advantages thereof are retained but the disadvantages thereof are eliminated.

The process according to the invention for connecting a tube body portion to a prefabricated tube head achieves the following advantages, in regard to that process. The close tolerances for the tube body portion and the tube head, which are required in the state of the art, can be considerably increased, with the consequence of easier and faster manufacture, that is to say shrinkages in head production and deviations in diameter in production of the tube body portion are no longer causes for rejection of the components. The process according to the invention can be operated with relatively low pressing pressures—a relatively small portion of material is pressed against a tube shoulder with embedding of a peripheral portion at the open end of the tube body portion into the portion of material—and at comparatively low tool temperatures, whereby the technical configuration of the pressing tools is simplified in comparison with those of the state of the art. The comparatively low pressing temperatures in conjunction with simplified pressing tools—it is sufficient for the pressing ram or die to be in the form of a ring—permit the preparation of fully manufactured tube heads, that is to say tube heads which are already provided with rotational or flap-type closures, membranes for sealing discharge openings, diffusion-inhibiting inserts (discs), arranged on the side of the shoulders, which is towards the interior of the tube body portion, etc. The possibility of preparing finished heads eliminates the known individual production steps which follow the pressing operation such as for example the operating of fitting closure means after the pressing procedure so that the process according to the invention makes it possible to further significantly increase the output of tubes per unit of time, in comparison with the state of the art, that is to say, without a high level of expenditure on an apparatus for carrying out the process, the output can be increased to 200 to 300 tubes per minute, a figure which could not be attained with the known process and the apparatuses used in the finished-head technology. Material compatibility which prevented making full use of the advantages of the finished-head technology is substantially overcome with the process according to the invention. As mentioned above, the connection between the shoulder (part of the head) and the tube body portion is critical, in other words, the quality of that connection determines the quality of the tube as such. As the number of materials, that is to say plastics, which are suitable for shaping a head by injection moulding or pressing is limited and the material of the inner layer (plastic material) of a body portion must be directly matched thereto for the purposes of making the connection, that results in a limitation on the free options of selecting the structure of webs of plastic material for the tube body portions. The process according to the invention, using a portion of connecting and sealing material of plastic for joining the tube body portion to the head, eliminates the aspect of direct compatibility which is known from the state of the art and which is necessary therein, so that, for any material to be packaged, the material for the shoulder and the tube body portion can be optimised in itself, in accordance with the respective material to be packaged.

BRIEF DESCRIPTION OF THE DRAWINGS

Further advantages, features and details of the invention are apparent from the following description of preferred embodiments of the process and the accompanying drawings in which:

FIG. 3b shows a chamfer as the outer periphery of a shoulder, optionally a step.

DETAILED DESCRIPTION

Figure 1A:
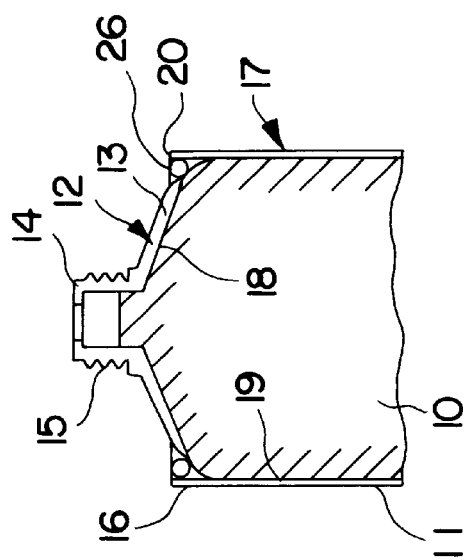
FIG. 1 in FIGS. 1a, 1b, 1c, 1d and 1e shows a first implementation of the process in which firstly a tube head is applied to a core bar or mandrel and then a portion of connecting material is applied to the tube head (downward pressing of the portion), FIG. 2 in FIGS. 2a, 2b, 2c, 2d and 2e shows a second implementation of the process in which firstly a portion of connecting material is put on to the core bar or mandrel and then the tube head is put on to the mandrel with portion (upward pressing of the portion), and FIG. 3 in FIG. 3a diagrammatically shows a shaping space extending around the mandrel at a transition from the mandrel periphery to the mandrel bevel
Figure 1B:
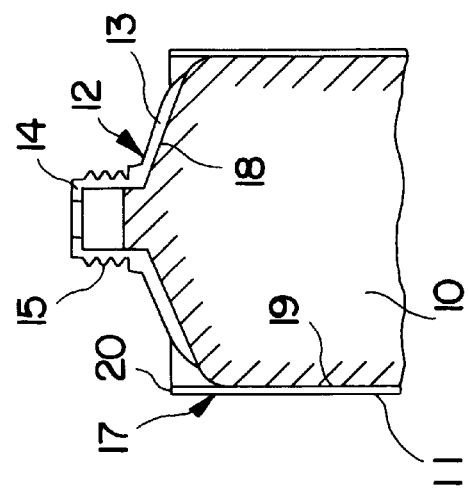

FIG. 1a diagrammatically shows a round core bar or mandrel 10. A tube body portion 11 is pushed on to the peripheral surface of the mandrel 10, which extends in the axial direction. The upper free end of the mandrel 10, that is to say its end face 10a, is of such a configuration (contoured) that a tube head 12 lies thereon completely with its internal surface. The tube head 12 is formed by a disc-shaped shoulder 13 from which projects the hollow-cylindrical discharge spout 14 into which engages a mandrel projection portion 15 which is concentric with respect to the mandrel 10 so that the tube head 12 is precisely centrally held on the contoured free end of the mandrel 10. As shown in FIG. 1a an annular portion 16 of the tube body portion 11 projects in the axial direction of the mandrel 10 beyond the transition 17 from the mandrel bevel 18 to the outer periphery 19, at the end face 10a. The axial extent of the portion 16 depends on the spacing A with which the free peripheral edge 20 of the portion 16—as viewed from the centre line M of the tube head—is to come to bear.

Figure 1C:
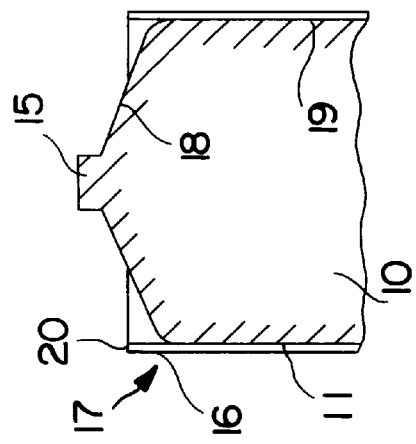

In accordance with the invention it may be desirable for the transition 17 of the mandrel bevel 18 to the outer periphery 19 of the mandrel 10 to be provided with a step 21, extending around the mandrel 10. Desirably a step 21 includes two step portions 21a, 21b, wherein the first step portion 21a, starting from the outer periphery of the mandrel 10 in the form of a bevel in a direction towards the centre line M, goes into a second step portion 21b which in turn connects to the mandrel bevel 18. In that respect the diameter, closest to the centre line M, of the connection between the second step portion and the mandrel bevel 18, that is to say the periphery of the step portion 21b, is of such a size that it is covered by the outer periphery of the shoulder 13 of the tube head 12 so that the step portion 21b, when the tube head 12 is fitted on to the mandrel 10, with the shoulder 13, forms an undercut configuration 22 which is provided in the end face 10a, while as viewed in the axial direction the first step portion 21a, in conjunction with the inner peripheral surface of the portion 16 of the tube body portion 11 and the outer periphery of the shoulder 13 of the tube head 12, forms an annular space 23 which is open to the shoulder 13 and which extends axially with respect to the mandrel 10. As FIG. 1c shows, in that way the second step portion 21b engages under the shoulder 13 and the annular space 23 (first step portion) which is connected to the second step portion 21b is afforded a shaping space F into which the portion 26 of connecting material, that is to say plastic material, which is plasticised by heat, is pressed.

FIG. 3b shows, in comparison with an outer peripheral surface extending parallel to the centre line of a tube head (see FIG. 3a), peripheral surfaces which are preferably in the form of a bevel 24 or a step 25. Reference 26 denotes a portion of connecting material which is applied to the outside surface of the shoulder 13. Preferably the portion 26 is a ring equally preferably of circular, lens-shaped or drop-shaped cross-section, which desirably bears against the inner surface of the portion 16, covering over the annular space 23.

Figure 1D:
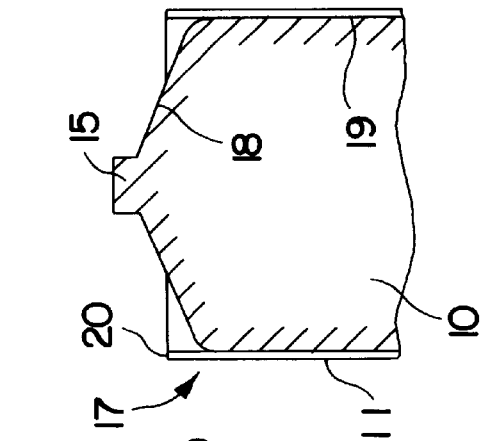
Figure 1E:
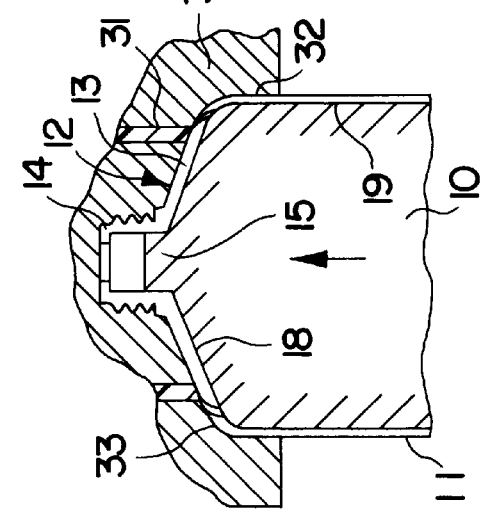

FIGS. 1d and 1e show the means for connecting the tube body portion 11 to the tube head 12. In FIG. 1d reference 30 denotes an annular mould into which a mandrel 10 with applied tube body portion 12, tube head 13 and material portion 26 is moved in an upward direction, more specifically before the beginning of the pressing operation, the termination of which is shown in FIG. 1e. The mould 30 (only diagrammatically illustrated) includes an inner ring 31 which is displaceable in the direction of movement of the mandrel 10, preferably in a spring-biased condition, and which serves as a means for holding the tube head 12 down on the mandrel and with its outside diameter as an axially displaceable shaping wall of the shaping contour of the mould 30. The shaping contour of the mould 30 is formed from a cylindrical portion 32 and a contoured portion 33 which in the present case is of a radius shape, connecting the cylindrical portion 32 to the outer wall of the inner ring 31. The inside diameter of the cylindrical portion 32 corresponds to the outside diameter of the mandrel 10, plus twice the wall thickness of the tube body portion 11. The radius-shaped portion 33 is of such a size that it reproduces the previously dimensioned transition between the tube body portion 11 and the tube head 12, or between the outer periphery of the shoulder 13 and the tube body portion 11.

In FIGS. 2a to 2e the same components as in FIGS. 1a to 1e are denoted by the same references, those components also performing the same functions. The essential difference in regard to the process shown in FIGS. 2a to 2e, in comparison with the process shown in FIGS. 1a to 1e, is that, in the process shown in FIGS. 2a to 2e, the material portion 26 is applied first to the mandrel 10, that is to say to the mandrel bevel 18 of the end face 10a of the mandrel 10 and then the tube head 12 is applied to the mandrel 10, that is to say, the procedure involves the reverse sequence to the process shown in FIGS. 1a to 1e. The latter is referred to as downward pressing and the former as upward pressing (in each case in accordance with the direction of flow of the material of the portion 26).

Figure 2A:
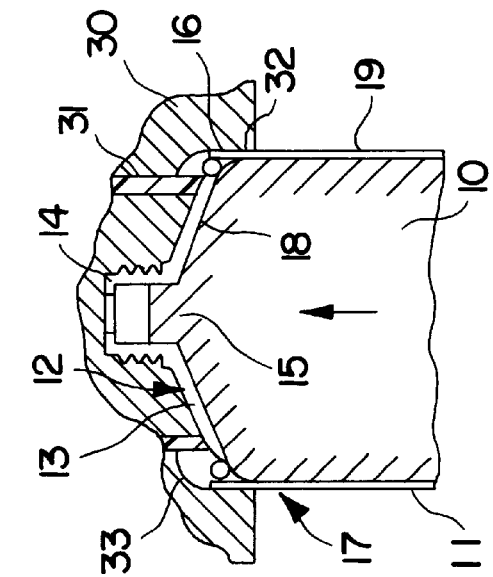

According to the invention as described in FIGS. 1a to 1e and FIGS. 2a to 2e the process essentially takes place in six sub-steps. The first sub-step in FIG. 1a and FIG. 2a comprises loading a mandrel 10 with a tube body portion 11 in such a way that a portion 16 of the tube body portion 11 projects beyond the transition 17 of the mandrel bevel 18 to the outer periphery 19 of the mandrel 10. In a second sub-step, FIG. 1b in the first implementation of the process, a prefabricated tube head 12 is applied to the mandrel 10, wherein the tube head is held centrally on the mandrel 10 over the discharge opening 14 and the mandrel projection portion 15 and has the portion 16 extending therearound, at a spacing therefrom. In the second implementation of the process, the material portion 26, as shown in FIG. 2b as the second step in the process, is firstly deposited on the mandrel bevel 18, extending around the inner periphery of the portion 16, that is to say on the transition 17 of the mandrel bevel 18 and the outer periphery 19 of the mandrel 10, whereafter, as shown in FIG. 2c, as the third step in the process, the tube head 12 is applied in a centred position so that the material portion is disposed substantially beneath the tube head 12. FIG. 1c as the third step in the process in its first implementation shows the application of a portion 20 of connecting material to the side of the shoulder 13, which is remote from the mandrel bevel 18, that is to say the outside of the shoulder 13, preferably bearing against the inner periphery of the portion 16 and extending along the periphery thereof. The portion 26 can be prefabricated and inserted or applied by extrusion in the form of a ring to the shoulder 13 or the mandrel bevel 18. With a mandrel 10 loaded in that way, it moves into a fixed, downwardly open, annular mould 30 in a fourth step in the process, as shown in FIGS. 1d and 2d. When that happens, the circular end face of the inner ring 31 comes into engagement with the outer surface of the shoulder 13 of the tube head 12. FIGS. 1e and 2e show the fifth step in the process, more specifically the terminated connection between the inner surface of the portion 16 and the shoulder 13 of the tube head 12 by means of the portion 26 of plasticisable connecting material. The pressing operation, preferably with the application of heat and pressure, is effected by perpendicularly upwardly directed insertion of the loaded mandrel 10 into the fixed mould 30. When the mandrel is introduced into the mould the inner ring 31 is displaced in the insertion direction, with the tube head 12 being at the same time held down on the mandrel 10, while the radiused portion 33 causes the material portion 26 to be pressed in opposite relationship to the direction of movement of the mandrel 10, for example into the annular space 23 and the undercut configuration 22, and the portion 16 is changed in shape in accordance with the dimensioning of the radiused portion 33, until for example a front free end of the portion 16 is brought into engagement with the bevel 24 or step 25 at the shoulder 13. Bevels 24 and steps 25 technically afford the advantage of increasing the size of the connecting surface areas, while from the aesthetic point of view they have the advantageous effect that the connecting seam between the front end of the portion 16 and the tube shoulder 13 is completely accommodated in the surface of the shoulder.

In the second implementation of the process the material portion 26 is pressed in the direction of movement of the mandrel 10 in an upward direction, against the mould 30. At the conclusion of that shaping operation the tube body portion 11 is connected to the tube head 12, forming a rounded (radiused) transition between the tube body portion 11 and the tube head 12, wherein that connection is reinforced on the inside of the tube by the connecting material in the undercut configuration 22 in conjunction with the material in the annular space 23 adhering to the material of the interior of the portions 16. Besides that reinforcement of the connection, this also provides for an outstandingly fault-free connection between the tube head 12 and the tube body 11. During the pressing operation, the outer periphery of the inner ring, in conjunction with the hold-down function, also provides that connecting material, for example plasticisable plastic material, on the outer surface of the shoulder, cannot move or flow in a direction towards the discharge spout 14 so that, from the optical point of view, a precisely delimited flow seam is reproduced on the shoulder 13. In comparison with the procedure known from the state of the art involving directly fusing the material of the interior of a tube body portion to the outer periphery of a prefabricated tube body portion or in the procedure involving pressing shaping of the head with simultaneous connection thereof to the tube body portion, the process according to the invention, as a result of the relatively small amount of material in the portion 26, involves much smaller quantities of heat for plasticisation and pressure melting of the tube body portion 11 and the tube head 12, which also involves shortened cooling times for solidification of the seams, that is to say peripheral seams. In principle it is possible in accordance with the invention for a plasticised material portion 26 to be used in connection with moulds 30 which are not heated or which are moderately heated, or it is possible for material portions 26 which are not plasticised to be used in conjunction with heated moulds 30 which plasticise the material portions 26 during the pressing procedure. In comparison with the processes known from the state of the art, the advantages of the smaller quantities of heat involved are higher production rates, resolving crystallisation problems of material portions in moulds before initiating the pressing operation, and colouration phenomena of the plastic material for the shoulders. Moreover the annular mould 30, in conjunction with the relatively small amounts of heat used, permits fully manufactured tube heads (tube heads with closure membranes, rotational or flap-type closures etc) to be connected to tube body portions, insofar as the inner annular space of the mould 30 leaves room therefor for passing over the head components during the pressing operation. After cooling of the peripherally extending seam which is formed in accordance with the invention, in a sixth step in the process which is the same for both implementations thereof (not shown in the drawing), the mandrel 10 is cleared by stripping off the tube body portion 11 with tube head 12. The mechanical means of a machine which can initiate and effect the steps in the process as outlined above are of many different kinds and are not illustrated.

What is claimed is:

1. A process for the production of packaging tubes comprising a tube body portion formed from a plastic material and a tube head which is connected to the tube body portion and which is prefabricated from a plastic material, in which the tube body portion is applied to a peripheral surface of a mandrel and the tube head is applied to an end face of the mandrel, the mandrel with tube body portion and tube head is introduced into a mould, and in the mould the tube body portion and the tube head are connected together using heat and pressure, comprising the step of connecting the tube body portion (11) to the tube head (12) by means of a connecting portion (26) wherein the mandrel (10) has an end face (10a) including a step portion (21) which defines with the tube head (12) an undercut configuration (22) which communicates with a gap (23) defined by an outer periphery of the tube head and the tube body portion (11), the undercut configuration (22) and the gap (23) define a shaping space (F) which receives the connecting portion (26).

2. A process according to claim 1 characterized in that the tube head (12) is put on to the end face (10a) of the mandrel (10) and then the connecting portion (26) is put on to a shoulder (13) of the tube head (12).

3. A process according to claim 1 characterized in that the connecting portion (26) is put on to a mandrel bevel (18) of the end face of the mandrel (10a) and the tube head (12) is then put on to the mandrel (10).

4. A process according to claim 1 characterized in that the connecting portion (26) is in the form of a prefabricated ring.

5. A process according to claim 1 characterized in that the connecting portion (26) is applied by extrusion in the form of a ring.

6. A process according to claim 1 characterized in that the tube body portion (11) is put on to the mandrel (10) with an annular portion (16) projecting beyond the end face of the mandrel (10a).

7. A process according to claim 6 characterized in the connecting portion (26) is deposited on to the tube head (12) and bears against an inside surface of the annular portion (16) of the tube body portion (11).

8. A process according to claim 6 characterized in that the outer periphery the tube head (12) has a bevel (24), on to which a free peripheral edge (20) of the annular portion (16) is moulded.

9. A process according to claim 6 characterized in that an outer peripheral surface of the mandrel is in the form of a step (25), and a front free end of the annular portion (16) is brought into engagement with the step.

10. A process according to claim 2 characterized in that the connecting of the connection portion (26) is effected in a mould (30), with the simultaneous formation of a rounded transition (17) between the tube body portion (11) and the tube head (12).

11. A process according to claim 10 characterized in that the mandrel has a bevel and that during the connecting of the connection portion (26) the tube head (12) is held on the mandrel bevel (18) by means of a spring-biased displaceable inner ring.

12. A process according to claim 1 characterized in that the step portion comprises a first portion (21*a*) extending from the peripheral surface of the mandrel toward the center line M thereof and a second indented portion (21*b*) extending from the first portion (21*a*) toward the center line M.

* * * * *